United States Patent [19]
Haberski

[11] 3,739,843
[45] June 19, 1973

[54] LIGHTWEIGHT PANEL STRUCTURE OF THE HONEYCOMB CORE TYPE

[75] Inventor: Richard Joseph Haberski, Emerson, N.J.

[73] Assignee: Curtis-Wright Corporation, Wood-Ridge, N.J.

[22] Filed: Nov. 1, 1971

[21] Appl. No.: 194,135

[52] U.S. Cl. .......................... 165/170, 29/157.3 V
[51] Int. Cl. ................................................ F28f 3/14
[58] Field of Search .......................... 165/170, 166; 138/39 A; 161/68 P; 29/157.3 V

[56] References Cited
UNITED STATES PATENTS

| | | | |
|---|---|---|---|
| 3,543,844 | 12/1970 | Jordon | 165/166 X |
| 3,111,747 | 11/1963 | Johnson | 165/170 X |
| 3,086,624 | 4/1963 | Wyatt | 165/170 X |

*Primary Examiner*—Charles J. Myhre
*Assistant Examiner*—Theophil W. Streule, Jr.
*Attorney*—Arthur Frederick

[57] ABSTRACT

An improved lightweight panel structure of the honeycomb core type comprises two spaced plates or sheets arranged in substantially parallel or concentric relationship. The opposite, juxtaposed surfaces of the plates are each provided with a plurality of spaced rows of extended surface elements which project from their associated surfaces in alternate side by side relationship to each other. The extended surface elements are dimensioned and shaped so that substantially all of the extended surface elements are each in abutment at two spaced points to thereby provide the panel assembly with structural strength resistant to flexure of the plates toward each other under compressive loading or bending force acting against the panel.

10 Claims, 4 Drawing Figures

INVENTOR.
RICHARD J. HABERSKI

LIGHTWEIGHT PANEL STRUCTURE OF THE HONEYCOMB CORE TYPE

This invention relates to an improved structural material and, more particularly, to a panel structure of the honeycomb core type.

BACKGROUND OF THE INVENTION

Heretofore, as exemplified in the U.S. Patent to Pajak, No. 2,609,068, the corrugated elements or strips forming the core of a lightweight panel structure, have been secured to each other and to the sheets of the panel by welding, brazing or in some other manner bonded together. This fabrication method is difficult and requires expensive machines and jigs.

Accordingly, it is an object of this invention to provide a panel structure of the honeycomb core type which is relatively easy and inexpensive to fabricate and in which internally brazed or welded connections are obviated.

SUMMARY OF THE INVENTION

The present invention contemplates a panel structure of the honeycomb core type which comprises two sheets or plates arranged in substantially parallel or concentric relationship. The opposite, juxtaposed surfaces of the plates are each provided with a plurality of spaced rows of extended surface elements. Each of the extended surface elements are curved in a direction away from its associated plate surface. The rows of extended surface elements of one plate surface are arranged to extend in alternate relationship with the rows of extended surface elements of the opposite plate surface and with the curvature of the extended surface elements of one plate surface lying in an opposite direction to the curvature of the extended surface elements of the opposite plate surface. The length of the extended surface elements, spacing between rows of extended surface elements and the degree of curvature of the extended surface elements are correlated so that when the assembled panel structure is in use, substantially all the extended surface elements are in abutment at two spaced points. One of the points of abutment is the distal end of a first surface element engaging the next adjacent second surface element projecting from the opposite plate surface while the other point of abutment of the first surface element is a point on its convex surface spaced which point engages a substantially corresponding point on a third surface element projecting from the opposite plate. This interlocking relationship of extended surface elements provides the panel assembly with structural strength to resist flexure of the plates toward each other under compressive loading or bending force acting against the panel. The opposite plates or sheets are secured together at their adjacent end portions in any suitable manner, such as by plates or sheets, spaced brackets, straps or the like, which serves to prevent the plates from movement in a direction away from each other. While all the peripheral end portions of the plates may be secured together, it is not essential since the securing of two opposite, adjacent end edge portions of the plates will be effective to prevent relative movement of the plates away from each other.

It is preferred that the extended surface elements be formed by a skiving process such as disclosed in the U. S. Patents to Kritzer, No. 3,202,312 and No. 3,229,722. This method of forming the extended surface elements avoids the time consuming and relatively expensive step of metallically bonding such elements to the primary plate surface.

BRIEF DESCRIPTION OF DRAWINGS

The invention will be more fully understood from the following description when considered in connection with the accompanying drawings in which.

DESCRIPTION OF THE PREFERRED EMBODIMENT

Figure 1:
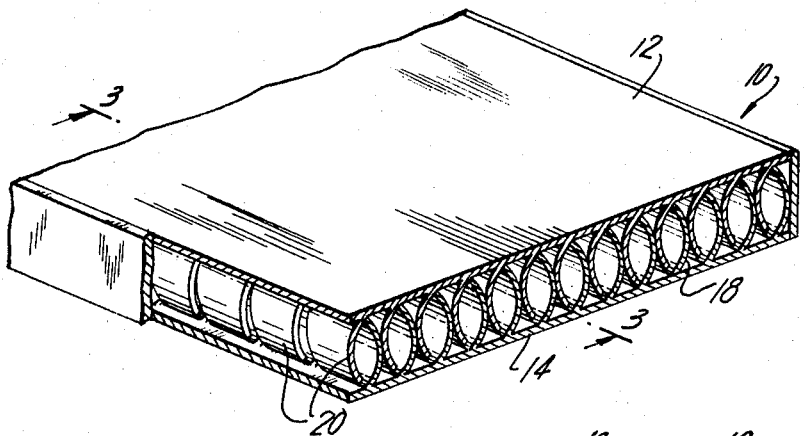
FIG. 1 is a view in perspective of a panel structure according to this invention with parts shown in cross-section for illustration purposes only.
Figure 3:
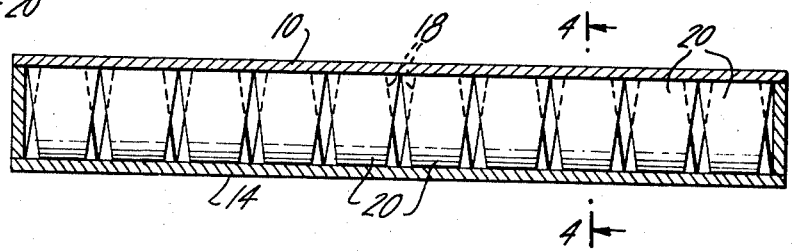
FIG. 3 is a cross-sectional view taken substantially along line 3—3 of FIG. 1 and on a somewhat enlarged scale.
Figure 4:
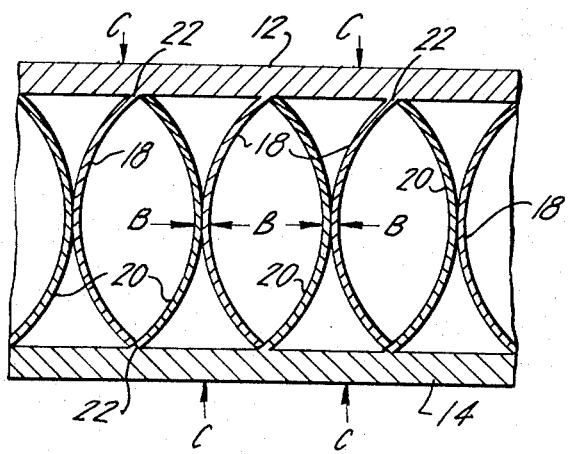
FIG. 4 is an enlarged fragmentary view taken along line 4—4 of FIG. 3.

Now referring to the drawing and, more particularly, FIGS. 1, 3 and 4, the reference number 10 generally identifies the lightweight panel structure of the honeycomb core type according to one embodiment of the present invention, which comprises two spaced sheets or plates 12 and 14 and a core consisting of interlocking extended surface elements 18 and 20 projecting from opposite, juxtaposed surfaces of plates 12 and 14, respectively.

The extended surface elements 18 and 20 of the respective plates 12 and 14 are arranged in spaced parallel rows. Each of the extended surface elements 18 and 20 is relatively thin in cross-section and curved upwardly and toward an imaginary plane containing its connection or root 22 with its associated plate. The rows of extended surface elements 18 and 20 are arranged in alternate, juxtaposition to each other so that the curvature or bend of the elements 18 extend opposite to the curvature or bend of extended surface elements 20. The degree of curvature of surface elements 18 and 20 is determined in relation to the spacing between plates 12 and 14 and the spacing between the rows so that, in assembly, the rows of surface elements 18 of plate 12 can be readily brought into alternate, juxtaposed relationship with the rows of surface elements 20 of plate 14 by merely moving plates 12 and 14 toward each other. Also, the degree of curvature relative to the spacing of the plates and the rows of surface elements is such that each surface element abuts another surface element of the opposite plate at a point between root 22 and its distal end and in abutment against the adjacent surface element projecting from the opposite plate in the root area of the latter element.

The aforesaid points of abutment between the rows of extended surface elements 18 and 20 function to absorb the compressive forces tending to bend plates 12 and 14 inwardly toward each other and the forces which may tend to bend the assembly. As indicated by the arrows, C, each of the surface elements function to convert the compressive forces acting against plates 12 and 14 into force components parallel to the primary plates as indicated by the arrows, B. These compressive or bending forces are absorbed or dissipated by equal and opposite force components B exerted by the abutting surface elements. Thus, the panel structure has high structural resistance to deformation forces and yet is light in weight.

While the abutment of juxtaposed rows of extended surface elements 18 and 20 is essential to provide the panel structure with the desired structural strength and rigidity, such abutment is not essential when the panel is not under load. If surface elements 18 and 20 are out of contact at their distal ends or at the points between the distal ends and their root areas 22, such non-abutment is not objectionable, providing, under load and before appreciable flexure of the plates, the surface elements come into abutment as herein described. Also, while the distal ends of surface elements 18 and 20 are preferably in engagement in the area of the root portion of the surface element of the opposed plate surface when under load, the distal ends may abut the surface of the opposite plate without departure from the scope and spirit of this invention.

Figure 2:
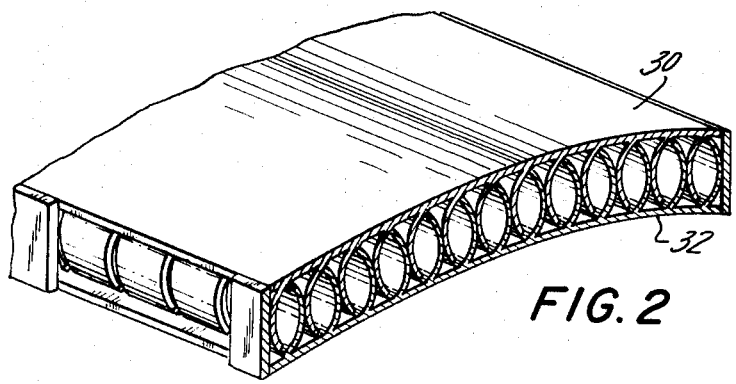
FIG. 2 is a perspective view similar to FIG. 1 of a panel structure according to another embodiment of this invention.

The panel structure 10 includes suitable means for securing plates 12 and 14 from movement in a direction away from each other. One such suitable means may be, as shown in FIG. 1, side plates 24 and 26 or, as shown in FIG. 2, spaced strips or straps 28 welded or otherwise suitably secured to the adjacent end edge portion of plates 12 and 14. For particular applications of panel structure 10, plates 24 and 26 need not be secured to all end edge portions of the plates; for example, in a rectangular shaped panel two opposite edge portions of plates 12 and 14 need only be secured together by plates 24, 26 or strips 28. The panels in some other applications may be provided with connecting means for plates 12 and 14 in the nature of slip joints (not shown) which would permit limited movement of the plates away from each other and sufficiently toward each other to bring extended surface elements into self-supporting abutment, as previously described.

As shown in FIG. 2, it is within the purview of the present invention to provide a panel structure having curved or arcuate shaped plates or sheets 30 and 32 which are disposed in substantially concentric relationship to each other. This embodiment of the invention only differs from panel structure 10 shown in FIG. 1, in that plates 30 and 32 are curved rather than flat as are plates 12 and 14 and are connected together by straps 28 rather than by side plates 24 and 26. In all other respects the panel structure of FIG. 2 is the same as panel structure 10 and, therefore, parts of the panel structure shown in FIG. 2 which correspond to parts of panel structure 10 are designated by the same reference number.

It is preferred that extended surface elements of plates 12, 14, 30 and 32 be produced by the skiving process as disclosed in the U. S. Patents to Kritzer No. 3,202,312 and No. 3,229,722. Also, as is well known in the art of skiving, the curvature of surface elements 18 and 20 is achieved by a deflecting plate disposed adjacent the cutter blade and movable with the latter to impart to the material a predetermined curvature as the surface element is being cut from spaced parallel ribs in the plate surface.

It is now believed readily apparent that the present invention provides an improved lightweight panel structure which is relatively easy to fabricate and in which internal metallic bonding of core elements and plates is obviated. It is a lightweight panel having relatively great structural strength which is independent of the quality of metallic bonds or welds.

Although only two embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. A lightweight panel structure of the honeycomb type comprising:
   a. two spaced plates;
   b. each of said plates having spaced rows of extended surface elements projecting from the opposite surfaces facing each other;
   c. each extended surface element has a curvature extending in a direction away from its associated plate surface;
   d. the rows of surface elements being disposed in alternate relationship to each other with the curvature of the extended surface elements in one row of a plate lying in a direction opposite the curvature of the extended surface elements in the next adjacent row of extended surface elements of the other plate;
   e. the extended surface elements being dimensioned so that substantially all of the extended surface elements of one plate are in abutment against the extended surface elements of the opposite plate at their curved portions and at their distal end portions are in abutment against the opposite plate, whereby the extended surface elements coact to dissipate forces tending to compress the plates together by converting the forces into oppositely directed force components, and
   f. means interconnecting the spaced plates to prevent their separation.

2. The apparatus of claim 1 wherein said two spaced points are the distal end portion of the extended surface element and a point spaced from the distal end.

3. The apparatus of claim 2 wherein the point of abutment spaced from the distal end is a point on the convex surfaces of the next adjacent extended surface elements.

4. The apparatus of claim 1 wherein one of said two spaced points of abutment is the distal end of a first surface element in engagement with the next adjacent second surface element projecting from the opposite plate surface at the point of attachment of the latter to its associated plate surface while the other point of abutment of the said first surface element is at a point on its convex surface in engagement with a substantially corresponding point on the convex surface of a third surface element disposed on the side of the first surface element opposite from the second surface element.

5. The apparatus of claim 1 wherein said extended surface elements are formed from the surface of their associated plates by skiving.

6. The apparatus of claim 1 wherein said extended surface elements in each row are in close spaced relationship to each other.

7. The apparatus of claim 1 wherein the extended surface elements are each relatively small in cross-sectional dimension as compared with the cross-sectional dimension of the plates.

8. The panel structure of claim 1 wherein said plates are flat and disposed in substantially parallel planes.

9. The panel structure of claim 1 wherein said plates are arcuately shaped and disposed in substantially concentric relationship.

10. A heat exchanger of the plate fin type for effecting indirect heat transfer between a plurality of fluids at different temperatures, comprising:
  a. two spaced plates;
  b. each of said plates having spaced rows of extended surface elements projecting from the opposite surfaces defining each of said passageways;
  c. each extended surface element has a curvature extending in a direction away from its associated plate surface and back toward an imaginary plane containing the point of attachment of the extended surface element to its associated plate;
  d. the rows of surface elements extending from one plate surface being disposed between the rows of surface elements extending from the opposite plate surface and with the curvature of the surface elements in one row of said one plate surface lying in a direction opposite the curvature of the surface elements in the next adjacent row projecting from the opposite plate surface;
  e. the extended surface elements being dimensioned so that the distal end of a first surface element engages the next adjacent second surface element of the opposite plate surface in the area of the point of attachment of the latter to the opposite plate and the first surface element also abuts at a point spaced from its distal end the next adjacent third surface element projecting from the opposite plate surface at a substantially corresponding point spaced from its distal end; and
  f. means interconnecting spaced plates to prevent their separation.

* * * * *